J. P. WILLIAMS.
ELECTRIC BURGLAR ALARM SYSTEM.
APPLICATION FILED MAR. 5, 1914.
1,181,419.
Patented May 2, 1916.
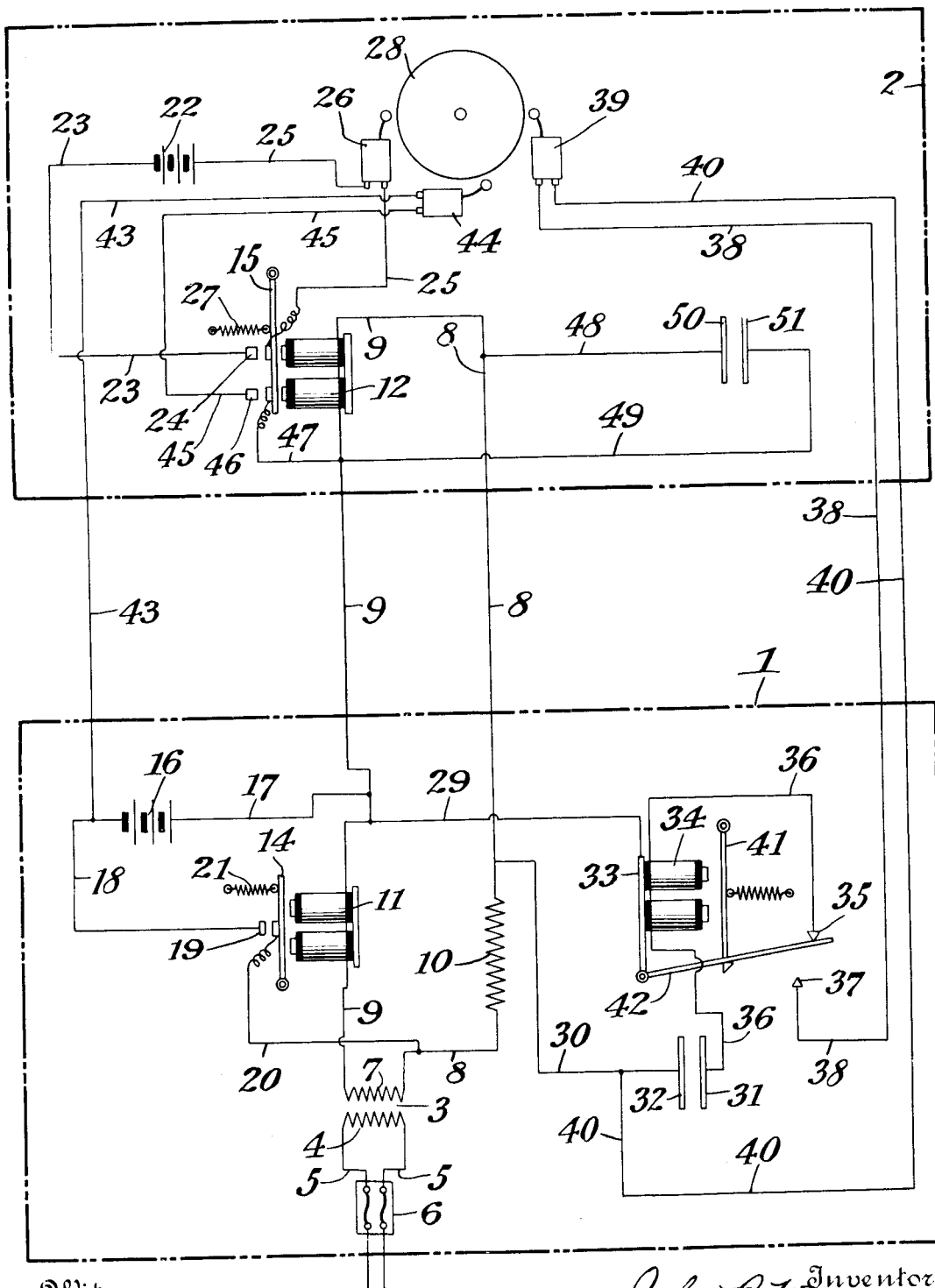

UNITED STATES PATENT OFFICE.

JOHN PRITCHARD WILLIAMS, OF NEW YORK, N. Y., ASSIGNOR TO DUPLEX ELECTRIC COMPANY, A CORPORATION OF DELAWARE.

ELECTRIC BURGLAR-ALARM SYSTEM.

1,181,419.

Specification of Letters Patent.  Patented May 2, 1916.

Application filed March 5, 1914. Serial No. 822,623.

*To all whom it may concern:*

Be it known that I, JOHN P. WILLIAMS, a citizen of the United States, and resident of New York, in the county and State of New York, have invented certain new and useful Improvements in Electric Burglar-Alarm Systems, of which the following is a specification.

This invention relates to electric burglar-alarm systems, and it has particular relation to means whereby an alternating current may be employed for the operation of alarm systems and employed in such combination or relation to a separate or supplementary battery or other source of electrical energy as will under normal conditions conserve such supplementary battery or other source of energy and retain the same from operative service, but which will throw such supplementary battery or other source of energy into operative status with relation to the alarm system whenever the alternating current is cut off.

My improvements have particular relation to that type of burglar-alarm systems which are arranged for the protection of vaults or compartments for the storage of valuables and which also preferably comprise a housing separate from the vault or protected structure and containing the alarm mechanism, such a type of alarm systems being illustrated in the patent to Jurnick, No. 1,038,594, of September 17, 1912; but it will be understood that my improvements are adapted for effective application and service in various other types of alarm systems and in a general respect to alarm systems which employ a direct current source of electrical energy from batteries or from direct current generators.

Heretofore, in alarm systems of the class to which my improvements relate, it has been customary to operate the system upon direct current from batteries, and the general conditions have occasioned inconvenience and expense under the necessity for frequent renewal of the batteries which, by reason of their constant use, rapidly deteriorate and require constant supervision and renewal at short intervals.

The object of my invention is to obviate this inconvenience and expense of battery renewal, and to enable the employment of alternating currents for the operation of the system under normal conditions, and at the same time provide for the operation of the system by the direct current from batteries in the event that the alternating current is for any reason cut off or out of service.

My improvements thus provide an alternating current attachment in connection with the general battery source of electrical energy for the operation of alarm systems, and enable the employment of a high voltage alternating current, such, for instance, as is usually employed in electric lighting circuits, it being simply necessary to reduce the voltage by means of any suitable transformer before it passes to the circuits of the alarm system for the operation thereof.

My improvements also thus comprise an alternating current connection for the operation of alarm systems, in combination with or supplementary to direct current means for operating the system, whether the means for operating the system, whether the source of such direct current is a battery or direct current generator, the relative arrangement being such that the direct current source of energy is conserved and retained from operative action at all times when the alternating current is in service.

In the accompanying drawings, I have illustrated one method of application of my invention to a burglar-alarm system of that type which is arranged for the protection of a vault or compartment and of a separate housing containing the alarm mechanism, the arrangement of the general system and circuits thereof being shown diagrammatically.

Referring to the drawings, the space inclosed by the dotted line 1 indicates the vault or other structure or compartment which is designed to be electrically protected, and the space inclosed by the dotted line 2 indicates the housing within which the alarm mechanism is contained, this housing being usually located at a desired point some distance from the vault or protected structure 1, for instance, on the street wall of a bank building.

The alternating current attachment comprises a transformer, 3, which may be of any usual or adapted type of ordinary bell-ringing transformer, to the primary coil of which, 4, are connected the line wires, 5—5, of an alternating current source of energy, for instance, the line wires of an ordinary electric lighting circuit or any other circuit included in the usual source of supply of alternating current for commercial purposes. The usual fuse connection for the line wires 5—5 is indicated at 6. The alternating current source of supply may be of any adapted voltage, for instance, the usual 110-130 volts common under commercial conditions for electric lighting or motor power. From the secondary coil, 7, of the transformer extend the conductors which are comprised in the alarm system, it being understood that the transformer is so wound that any desired or adapted voltage for the operation of the alarm system will be obtained from the secondary, for instance, 12 volts.

As herein shown, a closed alternating current circuit extends from the secondary coil of the transformer and is constituted by a conductor, 8, extending from one end of the transformer coil and connected with a conductor, 9, extending to the other end of the transformer coil.

In the application of my invention to alarm systems including the separate gong housing 2, as herein shown, the conductors 8 and 9 of the closed alternating current circuit are extended beyond the vault or protected structure 1 and to the alarm-controlling mechanism within the alarm housing 2. The closed circuit constituted by the conductors 8 and 9 comprises a network of wires or plates suitably arranged in relation to the walls of the protected structure 1, or any other circuit arrangement for protecting the structure 1 on a closed circuit (as will be readily understood by reference to the burglar-alarm systems of the type herein illustrated as shown in the patents of this art), such protective arrangement being herein illustrated in the form of a resistance in the conductor 8, as indicated at 10. It will be understood that the protective arrangement 10 is such that an attack upon the same will open the closed circuit 8—9 whereby the alternating current from the transformer will be disconnected. In the arrangement of the wires or plates for the protection of the vault or structure 1, herein shown as the resistance 10, the ohmic resistance thereof is increased or decreased in accordance with the operative requirements of the system, so as to reduce to a minimum the current required from the secondary of the transformer for operation through the closed circuit 8—9. Said closed alternating current circuit also comprises relays for governing the operation thereof with relation to the auxiliary electrical generating force as comprised in the alarm system and constituted by the direct current circuits operating through batteries or other sources of electrical energy. In the adaptation of my invention as herein illustrated, I have shown two of such relays, one of which, as at 11, is operative with relation to the battery circuits of the protected structure 1, and the other of which, as at 12, is operative with relation to the circuits of the alarm housing 2, and both of which relays are in connection with the conductor 9 of the closed alternating current circuit, said conductor passing through the coils of the relays. The magnet cores of these relays are designed to normally retain the armatures, 14 and 15, respectively, thereof, by action of the alternating current, and the structural conditions of the relays are therefore such that their cores are solid (that is, not laminated) and are of such metallic quality that when they are magnetized they will retain a certain percentage of permanent magnetism sufficient to prevent the armature from vibrating, whereby the tendency to vibration resulting from the alternations of the alternating current is obviated.

In connection with the alternating current circuit, comprising the transformer and relays as above described, an auxiliary or supplementary electrical generating force is provided for a direct current and is operative through circuit connections when the alternating current is cut off. Such auxiliary generating force is herein shown as the battery, 16, which is not operative while the alternating current is in action to retain the armature 14 of the relay 11. But, when the alternating current is cut off, thus releasing the armature 14 of the relay 11, the battery 16 is thrown into operation on the closed circuit 8—9 through a branch circuit constituted by a conductor, 17, extending from one side of the battery to the conductor 9, and a conductor, 18, extending from the other side of the battery to a contact, 19, which is closed upon the release of the armature 14, and a conductor, 20, extending from said armature to the conductor 8. The armature 14 is actuated to close the contact 19, upon its release from the action of the relay 11, by a spring, as at 21.

Under the relative arrangement and combination of the closed alternating current circuit and the auxiliary or supplementary electrical generating source or battery 16 in the branch circuit in connection therewith, as above described, said auxiliary source of electrical energy is brought into operation at any time the alternating current is disconnected or removed temporarily, and is operative to control the desired action of the alarm system until the alternating current is again restored. It will be understood that the conductors 17 and 20 are connected to the conductors 8 and 9 on opposite sides of the protective wiring represented at 10.

I have illustrated one arrangement of alarm mechanism, in operative relation to the relay 12 which is included in the closed circuit comprising the conductors 8—9. This arrangement includes an auxiliary generating force, herein shown as a battery 22, which is not operative while the closed circuit 8—9 is in action to retain the armature 15 of the relay 12. But, if the closed circuit 8—9 is for any reason broken, for instance, by an attack upon its protective wiring represented at 10 or by the cutting of either or both of the conductors 8—9, or current is cut off from said circuit, thus causing the release of the armature 15 of the relay 12, the battery 22 is thrown into operation on a circuit constituted by a conductor, 23, extending from one side of the battery to a contact, 24, which is closed upon the release of the armature 15, and a conductor, 25, extending from said armature through an alarm-actuating device, 26, to the other side of the battery. The armature 15 is actuated to close the contact 24, upon its release from the action of the relay 12, by a spring, as at 27. I have herein illustrated the alarm means as a gong, 28, adapted to be sounded by an electrically-operated hammer constituting the device 26, but it will be understood that any other desired type of electrically-operatable alarm means, either visual or sounding, may be employed.

In the preferred arrangement of the mechanism, with relation to the type of burglar-alarm system herein illustrated, the transformer 3, battery 16, the relay 11, and the circuit connections thereof, are located inside the guarded structure 1, in connection with the alternating current line wires 5—5 which enter the structure, and the closed-circuit conductors 8—9 pass from the guarded structure 1 to the alarm housing 2, the relay 12, battery 22, the alarm means, and the circuit connections thereof, being located inside the alarm housing 2. However, I do not desire to be understood as limiting myself to any particular arrangement of the parts of the system, as these can be located or installed as desired, according to the conditions and circumstances under which my present improvements are employed in alarm systems.

The mechanism and the circuit arrangements operating on the closed circuit 8—9, as hereinbefore described, are adapted for operation as follows: When the alternating current is on, the circuit is complete from one side of the secondary of the transformer 3 through the conductor 8 and protective wiring or resistance 10 and through the conductor 9 and coils of the relays 12 and 11 to the other side of the secondary of the transformer, and the armatures 15—14 are retained by the magnetized cores of their relays. Under these conditions, the contacts 19 and 24 are open, thus conserving the energy of the auxiliary batteries 16 and 22 and holding the alarm means out of operation. Now, if the alternating current is for any reason cut off from the closed circuit 8—9, thus removing current from the relays comprised therein, the battery 16 is thrown into service by action of the released armature 14 to close the contact 19 and it is then operative upon the closed circuit 8—9 by means of its conductor connections 17—18—20 therewith. As soon as the alternating current is restored to the closed circuit 8—9, the armature 14 is operated to open the contact 19 and the battery 16 is thus again thrown out of service. The closed circuit 8—9 is therefore at all times operative, either upon the alternating current or upon the auxiliary battery 16, and should said circuit be in any way broken the resulting release of the armature 15 of the relay 12 will close the contact 24 and thus cause the actuation of the alarm over the circuit 23—25 through the battery 22.

Under the circumstances of operation as just above set forth, and the arrangement of the system as hereinbefore described, when the alternating current is cut off from the closed circuit 8—9, and the auxiliary battery 16 is thrown into service, the battery is operative across the relay 12 which governs the actuation of the alarm mechanism. The relative adjustment of the armatures 15—14 of the respective relays 12—11 is therefore such that the contact 19 of the circuit of battery 16 is closed and throws said battery into service before the contact 24 of the circuit controlling the alarm mechanism through the battery 22 is closed whereby the current from the battery 16 will be operative to draw back the armature 15 of the relay 12 before the alarm circuit is completed across the contact 24, and thus prevent the false actuation of the alarm when the alternating curernt is cut off from the closed circuit 8—9. This precedent action of the armature 14 of the relay 11 is preferably effected by increasing the tension of the controlling spring 21 of the armature 14 and decreasing the tension of the controlling spring 27 of the armature 15, and also by increasing the space between the contact 24 and the armature 15 with respect to the space between the contact 19 and the armature 14.

In the preferred construction and arrangement as herein shown, upon failure of the alternating current and the consequent throwing in of the battery current, in which circumstances the latter divides at the connection of conductors 17 and 9, part passing through magnet 11 and the secondary coil 7 of the transformer 3 to connection with conductor 8 and thence through conductors 20 and 19 and 18 to the battery, there will be no interruption of the circuit through conductors 8 and 9 and causing of a false alarm at the alarm device 26 by reason of the passage of the battery current through the relay 11, as said relay will not be operated by the battery current, the resistance of the coil 7 of the transformer 3 preventing the passage of sufficient battery current through the relay.

I do not desire to be understood as limiting myself to the employment of relays for controlling the action of the auxiliary battery circuits or the alarm circuits, as small series or shunt-wound motors or galvanometers, or similar instruments wherein a tension may be obtained when an electric current is passed through their coils or springs, may be effectively employed, in the adaptation of my invention to general alarm systems, in lieu of the relay mechanism as herein shown.

It will be obvious that my improvements, as hereinabove described, are adapted for operative arrangement with relation to either closed or open circuits or on both closed and open circuits, and I therefore do not limit myself to any specific conditions of circuits. In this connection, I have also illustrated in the accompanying drawings an open-circuit arrangement comprising the conductors 8—9 from the secondary of the transformer 3 and the auxiliary battery-circuit connection therewith which includes the battery 16 and its circuit conductors 17—18—20 and contact 19, whereby said open-circuit arrangement is operative either upon the alternating current from the transformer or upon the auxiliary current represented by the battery 16 under the respective service conditions as hereinbefore described. This open-circuit arrangement comprises a conductor, 29, extending from the conductor 9 which passes through the coils of the relay 11, the point of connection being such that said relay is intermediate of the conductor 29 and the connection of the conductor 9 with one side of the secondary coil of the transformer 3, and a conductor, 30, extending from the conductor 8 which passes to the other side of the secondary coil of the transformer. Said conductors 29—30 are respectively in electrical connection with plates or conducting members, as indicated at 31 and 32 (for instance, lining plates or open contacts comprised in the wall structure or other parts of the protected structure 1), which plates in open circuit are separated a suitable distance, the circuit being closed by bridging the space between said plates or by the closing of the open contacts represented thereby, for instance, by an attack upon the separated lining plates with an instrument which will produce electrical connection between the same, and thus upon the closing of the circuit actuate an alarm. Preferably, in such open-circuit arrangements as adapted to burglar-alarm systems, an automatic drop is employed, which is first operated by the closing of the circuit and then maintains the circuit closed for the continuous actuation of the alarm until such time as the drop is re-set, and I have herein illustrated such an automatic drop arrangement in the open circuit for actuating the alarm. In the open-circuit arangement including the automatic drop, the conductor 29 extends to the frame, 33, of the automatic drop, 34, and from the normally-closed contact, 35, of said drop, a conductor, 36, extends through the coils of the drop to one of the plates or open-circuit contacts 31. From the normally-open contact, 37, of the automatic drop 34, extends a conductor, 38, to an alarm actuating device, 39, and the return conductor, 40, extends from the latter to a connection with the conductor 30, leading to the other plate or open-circuit contact 32.

When the alternating current from the transformer is in service, the operation of the open circuit arrangement as just above described, upon a short circuit being established between the plates or contacts 31—32, is as follows: The circuit is closed through the conductor 8, conductor 30, across the plates or contacts 31—32, through the conductor 36 and the coils of the automatic drop 34, through the normally-closed contact 35 and the frame 33 of the drop and through the conductor 29 and the conductor 9 and the coils of the relay 11 to the side of the secondary of the transformer which is opposite from the connection of the conductor 8. This completed alternating-current circuit magnetizes the cores of the automatic drop 34 and causes the movement of the armature, 41, thereof to release the contact bar, 42, and thus cause the opening of the contact 35 and the closing of the contact 37, by which action the alarm-actuating device 39 is thrown across the circuit which is then closed from the alternating current transformer and becomes operative to actuate the alarm. The closed circuit which is thus continuously maintained until the automatic drop is re-set is as follows: from one side of the secondary coil of the transformer 3, through conductor 8, conductor 30, conductor 40, the alarm-actuating device 39, conductor 38, closed contact 37, the frame 33—42 of the automatic drop 34, conductor 29, and conductor 9 to the other side of the secondary of the transformer.

In the event that the alternating current is for any reason cut off, which action will throw into service the auxiliary generating force represented by the battery 16 by action of the released armature 14 of the relay 11 to close the contact 19, the same operation upon the normally-open circuit as that just above set forth will follow from the action of the battery 16 in case a short circuit is produced across the plates or contacts 31—32. The operation of the circuit when thus thrown across the battery 16 is as follows: from one side of battery 16 through conductor 18, closed contact 19, conductor 20, conductor 8, conductor 30, across the short circuited plates or contacts 31—32, conductor 36, closed contact 35, the frame 33—42 of the automatic drop 34, conductor 29, conductor 9, and conductor 10 to the opposite side of battery 16. This closed circuit will energize the automatic drop 34 and thus cause the opening of the closed contact 35 and the closing of the open contact 37, when the continuous alarm-actuating closed circuit across the alarm-actuating device 39 will be established in the same manner as that hereinabove described with relation to the alternating current, and will be operative upon the battery 16 by reason of the connection of the circuit conductors of said battery with the conductors 8 and 9.

In illustration of the circuit arrangements adaptable in connection with my present invention and improvements, I have also herein shown another arrangement of a normally-open circuit which when closed will operate by the main auxiliary generating force represented by the battery 16. This open circuit comprises a conductor, 43, extending from a connection with one side of the battery 16 to an alarm actuating device, 44, a return conductor, 45, extending from said alarm-actuating device to a normally-open contact, 46, adapted to be closed by the armature 15 of the relay 12 upon its release, and a conductor, 47, extending from said armature to the conductor 9 which connects with the conductor 17 to the opposite side of the battery 16. The operation of this normally-open circuit is as follows: When the armature 15 of the relay 12 is released, which action follows when the current is for any reason cut off from the coils of said relay, the contact 46 is closed, and a circuit is established, across the main auxiliary generating force represented by the battery 16, through the conductor 45, the alarm-actuating device 44, the conductor 43, through the battery 16, the conductor 17, the conductor 9, and the conductor 47 back to the closed contact 46, and the alarm will be actuated upon this circuit until the contact 46 is again opened by action of the relay 15. This arrangement of an open-circuit connection may be employed in lieu of the alarm circuit connection which includes the battery 22, or it may be employed conjointly in connection with the alarm circuit which includes the battery 22, in which latter instance it will afford a reserve battery force constituted by the battery 16 in addition to the battery force constituted by the battery 22. In the preferred construction, as herein illustrated the operative spacing of the normally-open contact 46 is under the same conditions as those hereinbefore described with relation to the normally-open contact 24, both of said contacts 46 and 24 being governed by the action of the armature 15 of the relay 12, which is controlled by the reduced-tension spring 27, whereby the action of the armature 14 of the relay 11 to throw into service the battery 16 will be precedent to the action of the armature 15 of the relay 12, to avoid the giving of a false alarm when the alternating current is cut off and the relay 12 is energized by the throwing into service of the battery 16, under the conditions as hereinbefore fully described.

I have also herein illustrated another circuit arrangement or connection with the main circuit conductors 8—9, whereby the circuit including said conductors, whether operating on the alternating current from the transformer 3 or on the current from the auxiliary battery 16, will be operative in connection with a protected alarm housing such as is shown in the patent to Juruick, No. 1,038,594, of September 17, 1912, in which said housing is itself protected on an open circuit deriving its energy from the main source of electrical energy which is comprised in the system protecting the vault or protected structure (herein indicated at 1). In this type or condition of installation of the alarm mechanism, with relation to my present improvements, it is simply necessary to connect the conductors, of the open protective circuit of the alarm housing as represented in said Juruick patent, with the circuit conductors 8—9 of the system as herein illustrated, under which conditions the protective circuit of said alarm housing will operate when closed, upon either the alternating current from the transformer or the current from the auxiliary battery 16, to actuate the alarm mechanism within the alarm housing, as will be readily understood. The illustration of the connection of my present improvements with the protective circuit of the alarm housing as comprised in said Juruick patent, is herein shown as the conductor, 48, leading to the conductor 8, and the conductor, 49, leading to the conductor 9, said conductors 48—49 extending from the circuit conductors 8—9 to the alarm housing and being respectively in connection with separated plates or open contacts, as at 50 and 51, comprised in the alarm housing. This type of open-circuit connection will operate in the same manner as the open circuit hereinbefore described with relation to the conductors 29—30, when the plates or contacts 50—51 are short circuited, and in said circuit connection 48—49 an automatic drop arrangement, corresponding to that hereinbefore described with reference to the automatic drop 34, may be employed, as represented in said Juruick patent and as will be readily understood by reference thereto.

It will also be understood that my present improvements may, under one of the many conditions of installation, be employed in connection with the independently-protected alarm housing of the type shown in my application for patent Serial No. 558,035, filed April 27, 1910, under which circumstances the circuit as herein shown including the battery 22 and the contact 24 and the conductors 23—25 will be in connection with the independent protected circuits of said independently-protected alarm housing. In such installation, in connection with the independently-protected alarm housing herein referred to, the relay 12 and the circuit including the battery 22 and the alarm mechanism operating upon said circuit will be all contained within the protected alarm housing.

The operation and advantages of my present improvements will be readily understood by those skilled in the art to which the invention appertains.

The general arrangement and operation of the various open and closed circuit connections adaptable to my present improvements is set forth in the foregoing description, from which it will be understood that whether the system is operating upon either closed or open circuits the alarm mechanism will be actuated upon the alternating current while such current is in service and upon the auxiliary source of electrical energy represented by the battery 16 when the alternating current is not in service.

With reference to the closed circuit including the conductors 8—9 and the protective wiring represented by the illustration of the resistance 10, it will be understood that should said closed circuit be broken by an attack which severs the protective wiring 10 or severs either or both of the conductors 8—9, the alternating circuit is entirely cut off and the armatures 15—14 of both the relays 12—11 are released and the alarm mechanism is consequently actuated through the operation of the alarm circuits. The same conditions of operation would of course follow if the closed circuit 8—9 were operating upon the auxiliary force represented by the battery 16. It will furthermore be understood that when the alternating current is cut off by the breaking of the closed circuit 8—9, in the manner above described, the battery 16 will not then be thrown into service, for its operation would be upon the broken circuit 8—9. It will also be noted that the resistance of the secondary coil of the transformer 3 is sufficient to prevent the passage of sufficient current through the coils of the relay 11 to retain the armature 14 against the cores of said relay.

While I have herein illustrated my invention in its application or adaptability to burglar-alarm systems, it will be understood that my improvements are adapted for effective employment in all types of electric alarm systems, for instance, fire-alarm systems and other electrical installations in which it is desired to actuate an alarm under the conditions of use.

I do not desire to be understood as limiting myself to the details of construction and arrangement of parts and the circuit arrangements as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. In an electric alarm system, a protective circuit comprising means governing the action of the circuit upon an attack thereon or tampering therewith, a transformer in connection with said circuit, an alternating current source of supply to said transformer, a branch circuit in connection with said protective circuit, an auxiliary electrical generating force in connection with said branch circuit, relay mechanism in said protective circuit and comprising an armature governing the operation of said branch circuit, whereby said branch circuit and auxiliary generating force is held out of service when the alternating current is in service and is thrown into service upon said protective circuit when the alternating current is removed therefrom, an alarm circuit, relay mechanism in said protective circuit and comprising an armature governing the operation of said alarm circuit, and means comprised in said relay mechanisms whereby the action of the armature of the relay for throwing into service said auxiliary generating force is precedent to the action of the armature of the relay for throwing the alarm circuit into operation.

2. In an electric alarm system, a protective circuit comprising means governing the action of the circuit upon an attack thereon or tampering therewith, a transformer in connection with said circuit, a high-voltage current source of supply to said transformer, a branch circuit in connection with said protective circuit, an auxiliary low-voltage electrical generating force in connection with said branch circuit, means in said protective circuit for governing the operation of said branch circuit, whereby said branch circuit and auxiliary generating force is held out of service when the high-voltage current is in service and is thrown into service upon said protective circuit when the high-voltage current is removed therefrom, an alarm circuit, auxiliary means in said protective circuit for governing the operation of said alarm circuit, and means whereby the action of the means in the protective circuit for throwing into service said auxiliary generating force is precedent to the action of the auxiliary means in the protective circuit for throwing the alarm circuit into operation.

3. In an electric alarm system, a protective circuit comprising means governing the action of the circuit upon an attack thereon or tampering therewith, an electric current source of supply to said protective circuit, a branch circuit in connection with said protective circuit, an auxiliary electrical generating force in connection with said branch circuit, means in said protective circuit for governing the operation of said branch circuit, whereby said branch circuit and its auxiliary generating force is held out of service when the first-mentioned electric current source of supply to the protective circuit is in service and is thrown into service upon said protective circuit when said first-mentioned electric current source of supply is removed therefrom, an alarm circuit, auxiliary means in said protective circuit or governing the operation of said alarm circuit, and means whereby the action of the means in the protective circuit for throwing into service said auxiliary generating force is precedent to the action of the auxiliary means in the protective circuit for throwing the alarm circuit into operation.

4. In an electric alarm system, a protective circuit comprising means governing the action of the circuit upon an attack thereon or tampering therewith, an electric current source of supply to said protective circuit, a branch circuit in connection with said protective circuit, an auxiliary electrical generating force in connection with said branch circuit, means whereby said branch circuit and its auxiliary generating force is held out of service when said first-mentioned electric current source of supply to the protective circuit is in service and is thrown into service upon said protective circuit when said first-mentioned electric current source of supply is removed therefrom, an alarm circuit, means governing the operation of said alarm circuit, and means whereby the action of the means for throwing into service said auxiliary generating force is precedent to the action of said alarm circuit governing means for throwing the alarm circuit into operation.

In testimony whereof I have signed my name in the presence of the subscribing witnesses.

JOHN PRITCHARD WILLIAMS

Witnesses:
 TERESA G. LYONS,
 W. D. HECHT.